(12) United States Patent
Sayers et al.

(10) Patent No.: US 7,299,132 B2
(45) Date of Patent: Nov. 20, 2007

(54) METHOD AND SYSTEM FOR PRE-DRILL POREPRESSURE PREDICTION

(75) Inventors: Colin M. Sayers, Katy, TX (US); Richard A. Birchwood, Houston, TX (US)

(73) Assignee: Schlumberger Technology Corp., Houston, TX (US)

( * ) Notice: Subject to any disclaimer, the term of this patent is extended or adjusted under 35 U.S.C. 154(b) by 0 days.

(21) Appl. No.: 11/499,931

(22) Filed: Aug. 7, 2006

(65) Prior Publication Data

US 2007/0038377 A1 Feb. 15, 2007

Related U.S. Application Data

(60) Provisional application No. 60/595,814, filed on Aug. 8, 2005.

(51) Int. Cl.
*E21B 44/00* (2006.01)
*G01V 9/00* (2006.01)

(52) U.S. Cl. .................. 702/9; 702/6; 700/160; 700/173; 73/152.01; 73/152.03; 73/152.43

(58) Field of Classification Search .......... 700/159, 700/160, 173; 702/6, 9, 11; 73/152.01, 73/152.03, 152.43, 152.46, 152.54; 367/25, 367/35, 86
See application file for complete search history.

(56) References Cited

U.S. PATENT DOCUMENTS

| 5,130,949 A | 7/1992 | Kan et al. |
| 6,351,991 B1 * | 3/2002 | Sinha ...................... 73/152.01 |

(Continued)

OTHER PUBLICATIONS

Sayers, C. M. et al.; "Predrill pore-pressure prediction using seismic data"; Geophysics Soc. Exploration Geophysicists USA; vol. 67, No. 4, Jul. 2002; pp. 1286-1292; XP007902195, ISSN: 0016-8033.

(Continued)

*Primary Examiner*—Leo Picard
*Assistant Examiner*—Charles Kasenge
(74) *Attorney, Agent, or Firm*—Osha Liang LLP

(57) ABSTRACT

A method for pore pressure prediction. The method includes obtaining a stress sensitivity coefficient, obtaining a compressional wave (P-wave) velocity and a shear wave (S-wave) velocity for a pre-drill location and obtaining a first predicted pore pressure. Further, the method includes iteratively performing calculating a total stress value associated with the pre-drill location using the first predicted pore pressure associated with the pre-drill location, and calculating a second predicted pore pressure associated with the pre-drill location using a stress-pressure relationship equation, a stress-velocity relationship equation, the stress sensitivity coefficient, a reference location, and at least one selected from a group consisting of the P-wave velocity and the S-wave velocity for the pre-drill location, and adjusting a drilling operation associated with the pre-drill location, based on the second predicted pore pressure.

57 Claims, 4 Drawing Sheets

U.S. PATENT DOCUMENTS

| | | | |
|---|---|---|---|
| 6,714,873 B2* | 3/2004 | Bakulin et al. | 73/152.01 |
| 6,968,274 B2* | 11/2005 | Tutuncu et al. | 702/11 |
| 7,042,802 B2* | 5/2006 | Sinha | 367/86 |
| 2003/0125878 A1* | 7/2003 | Bakulin et al. | 702/14 |
| 2004/0141414 A1 | 7/2004 | Huffman et al. | |
| 2004/0236513 A1* | 11/2004 | Tutuncu et al. | 702/11 |
| 2005/0065730 A1* | 3/2005 | Sinha | 702/7 |
| 2005/0149267 A1* | 7/2005 | Van Den Beukel et al. | 702/14 |
| 2005/0197780 A1* | 9/2005 | Moos et al. | 702/14 |

OTHER PUBLICATIONS

Eaton, B.A. et al.; "The Equation for Geopressure Prediction from Well Logs"; SPE 5544, 1975, 11 pages; XP008018943.

Fredrich, J. T. et al.; "Stress Perturbations Adjacent to Salt Bodies in the Deepwater Gulf of Mexico"; SPE Annual Technical Conference and Exhibition, SPE 84554; Oct. 4, 2003; pp. 5121-5134; XP002352275.

PCT International Search Report dated May 18, 2007.

* cited by examiner

METHOD AND SYSTEM FOR PRE-DRILL PORE PRESSURE PREDICTION

CROSS-REFERENCE TO RELATED APPLICATIONS

This application claims priority from U.S. Provisional Patent Application No. 60/595,814 entitled "Sub-Salt Pore Pressure Prediction," filed Aug. 8, 2005 in the names of Colin Michael Sayers and Richard Anthony Birchwood, the entire contents of which are incorporated herein by reference.

BACKGROUND

Certain substances (e.g., salt, etc.) have low permeability, i.e., do not readily transmit fluids. In some cases, a low permeability substance may be located above a substance that is targeted by a drilling operation.

FIG. 1 shows an exemplary diagram of a drilling operation. Those skilled in the art will appreciate that the drilling operation shown in FIG. 1 is provided for exemplary purposes only and accordingly should not be construed as limiting the scope of the invention. For example, the drilling operation shown in FIG. 1 is a seafloor drilling operation, but the drilling operation may alternatively be a land drilling operation.

As shown in FIG. 1, a drilling rig (105) is configured to drill into a formation (e.g., a formation below a seafloor (110)) using a drill bit (not shown) coupled to the distal end of a drill string (125). Specifically, the drill bit is used to drill a borehole (130) extending to a target substance (120). The target substance (120) may be hydrocarbon or a mineral resource targeted by a drilling operation. Further, as shown in FIG. 1, a low permeability substance (115) may be located above the target substance (120). Thus, to reach the target substance (120), the borehole (130) may be required to pass through the low permeability substance (115).

When sediment of low permeability substance is buried or compacted, fluid may be trapped in pores within the resulting structure (i.e., within the low permeability substance itself and/or within substances beneath the low permeability substance (e.g., sand, etc.). Fluid trapped in this manner exerts pressure on the surrounding formation referred to as pore pressure. Formations in which pore pressure exceeds hydrostatic pressure at a given depth are referred to as overpressured.

When drilling in an overpressured formation, the mud weight (i.e., the weight of drilling fluids transmitted to the borehole) must be high enough to prevent the pore pressure from moving formation fluids into the borehole. In the worst case, formation fluids entering a borehole may result in loss of the well and/or injury to personnel operating the drilling rig. Accordingly, for safe and economic drilling, it is essential that the pore pressure be predicted with sufficient accuracy. In particular, it is beneficial to predict pore pressure pre-drill, i.e., either before any drilling has commenced and/or at a location that the drill bit has not yet reached.

Conventionally, pre-drill pore pressure prediction is based on the use of pre-drill seismic velocities and a velocity-to-pore pressure transform calibrated using offset well data (i.e., data from other wells near the drilling site). However, in some cases (e.g., when drilling under salt), conventional pre-drill pore pressure predictions may not be sufficiently accurate. Further discussion of conventional pre-drill pore pressure prediction techniques can be found in Sayers C M, Johnson G M, and Denyer G., 2002, *"Pre-drill Pore Pressure Prediction Using Seismic Data,"* Geophysics, 67, 1286-1292.

Mud is used in drilling operations to cool the drill bit, to transport cuttings generated by the drilling operation to the surface, to prevent the influx of formation fluids into the borehole, and to stabilize the borehole. With respect to preventing the influx of formation fluids, the drilling operator must maintain the mud weight at or above the pore pressure. With respect to stabilizing the borehole, drilling operators adjust the mud weight (i.e., the density of the mud being used) to counter the tendency of the borehole to cave in. However, the drilling operator must be careful not to fracture the formation by using an excessively high mud weight.

Moreover, too high a mud weight may result in an unacceptably low drilling rate. Accordingly, the mud weight must be low enough to maintain an acceptable drilling rate and avoid fracturing the formation. In such cases, the allowable mud weight window (i.e., the range of allowable mud weights) may be small when drilling in overpressured formations. Specifically, the force exerted by the mud must fall within the range between the pore pressure (or the pressure to prevent a cave in, if higher than the pore pressure) and the pressure required to fracture the formation.

Further, when drilling in overpressured formations, the number of required casing strings (i.e., structural supports inserted into the borehole) may be increased. Specifically, if a sufficiently accurate pre-drill pore pressure prediction is not available, additional casing strings may be inserted prematurely, to avoid the possibility of well control problems (e.g., influx of formation fluids) and/or borehole failure. Prematurely inserting casing strings may delay the drilling operation and/or reduce the size of the borehole and result in financial loss.

SUMMARY

In general, in one aspect, the invention relates to a method for pore pressure prediction. The method includes obtaining a stress sensitivity coefficient, obtaining a compressional wave (P-wave) velocity and a shear wave (S-wave) velocity for a pre-drill location, obtaining a first predicted pore pressure, iteratively performing: calculating a total stress value associated with the pre-drill location using the first predicted pore pressure associated with the pre-drill location; and calculating a second predicted pore pressure associated with the pre-drill location using a stress-pressure relationship equation, a stress-velocity relationship equation, the stress sensitivity coefficient, a reference location, and at least one selected from a group consisting of the P-wave velocity and the S-wave velocity for the pre-drill location, wherein iterating is complete if a difference between the first predicted pore pressure and the second predicted pore pressure is less than or equal to a threshold difference value, and wherein the first predicted pore pressure is updated using the second predicted pore pressure if the difference is greater than the threshold difference value, and adjusting a drilling operation associated with the pre-drill location, based on the second predicted pore pressure.

In general, in one aspect, the invention relates to a computer readable medium comprising instructions to perform a method for pore pressure prediction. The method includes obtaining a stress sensitivity coefficient, obtaining a compressional wave (P-wave) velocity and a shear wave (S-wave) velocity for a pre-drill location, obtaining a first predicted pore pressure, iteratively performing: calculating a total stress value associated with the pre-drill location using the first predicted pore pressure associated with the pre-drill location; and calculating a second predicted pore pressure associated with the pre-drill location using a stress-pressure relationship equation, a stress-velocity relationship equation, the stress sensitivity coefficient, a reference location, and at least one selected from a group consisting of the P-wave velocity and the S-wave velocity for the pre-drill location, wherein iterating is complete if a difference between the first predicted pore pressure and the second predicted pore pressure is less than or equal to a threshold difference value, and wherein the first predicted pore pressure is updated using the second predicted pore pressure if the difference is greater than the threshold difference value, and adjusting a drilling operation associated with the pre-drill location, based on the second predicted pore pressure.

In general, in one aspect, the invention relates to a downhole tool configured to perform a method for pore pressure prediction. The method includes obtaining a stress sensitivity coefficient, obtaining a compressional wave (P-wave) velocity and a shear wave (S-wave) velocity for a pre-drill location, obtaining a first predicted pore pressure, iteratively performing: calculating a total stress value associated with the pre-drill location using the first predicted pore pressure associated with the pre-drill location; and calculating a second predicted pore pressure associated with the pre-drill location using a stress-pressure relationship equation, a stress-velocity relationship equation, the stress sensitivity coefficient, a reference location, and at least one selected from a group consisting of the P-wave velocity and the S-wave velocity for the pre-drill location, wherein iterating is complete if a difference between the first predicted pore pressure and the second predicted pore pressure is less than or equal to a threshold difference value, and wherein the first predicted pore pressure is updated using the second predicted pore pressure if the difference is greater than the threshold difference value, and adjusting a drilling operation associated with the pre-drill location, based on the second predicted pore pressure.

Other aspects of the invention will be apparent from the following description and the appended claims.

DETAILED DESCRIPTION

Figure 1:
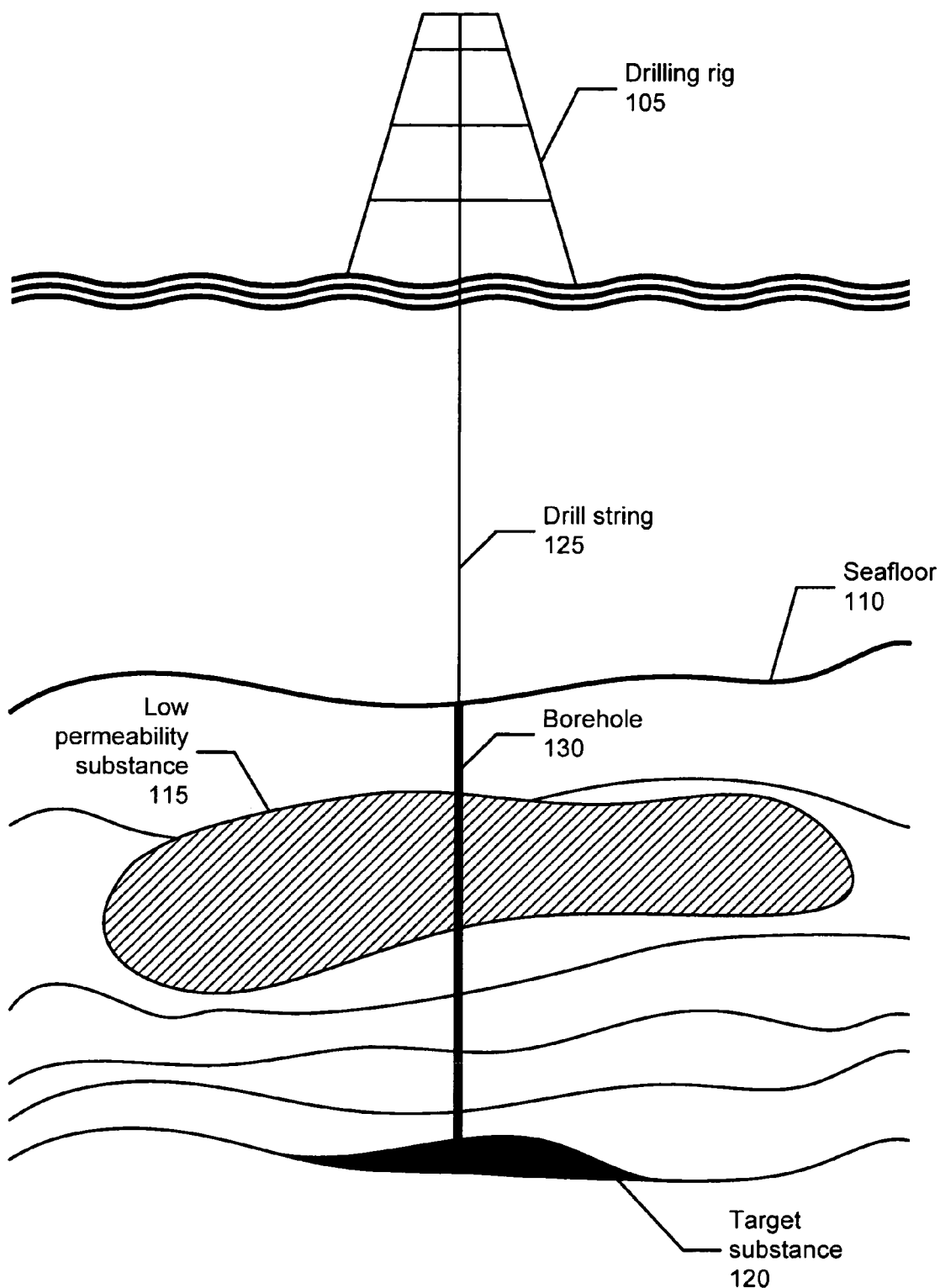
FIG. 1 shows an exemplary diagram of a drilling operation.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for pre-drill pore pressure prediction. Specifically, pre-drill pore pressure is predicted using reference data, acoustic or seismic wave velocities associated with a pre-drill location, at least one stress-velocity relationship equation, and a stress-pressure relationship equation. In one or more embodiments of the invention, the pore pressure is iteratively predicted until a threshold condition is satisfied. A drilling operation associated with the pre-drill location is adjusted based on the predicted pore pressure.

Figure 2:
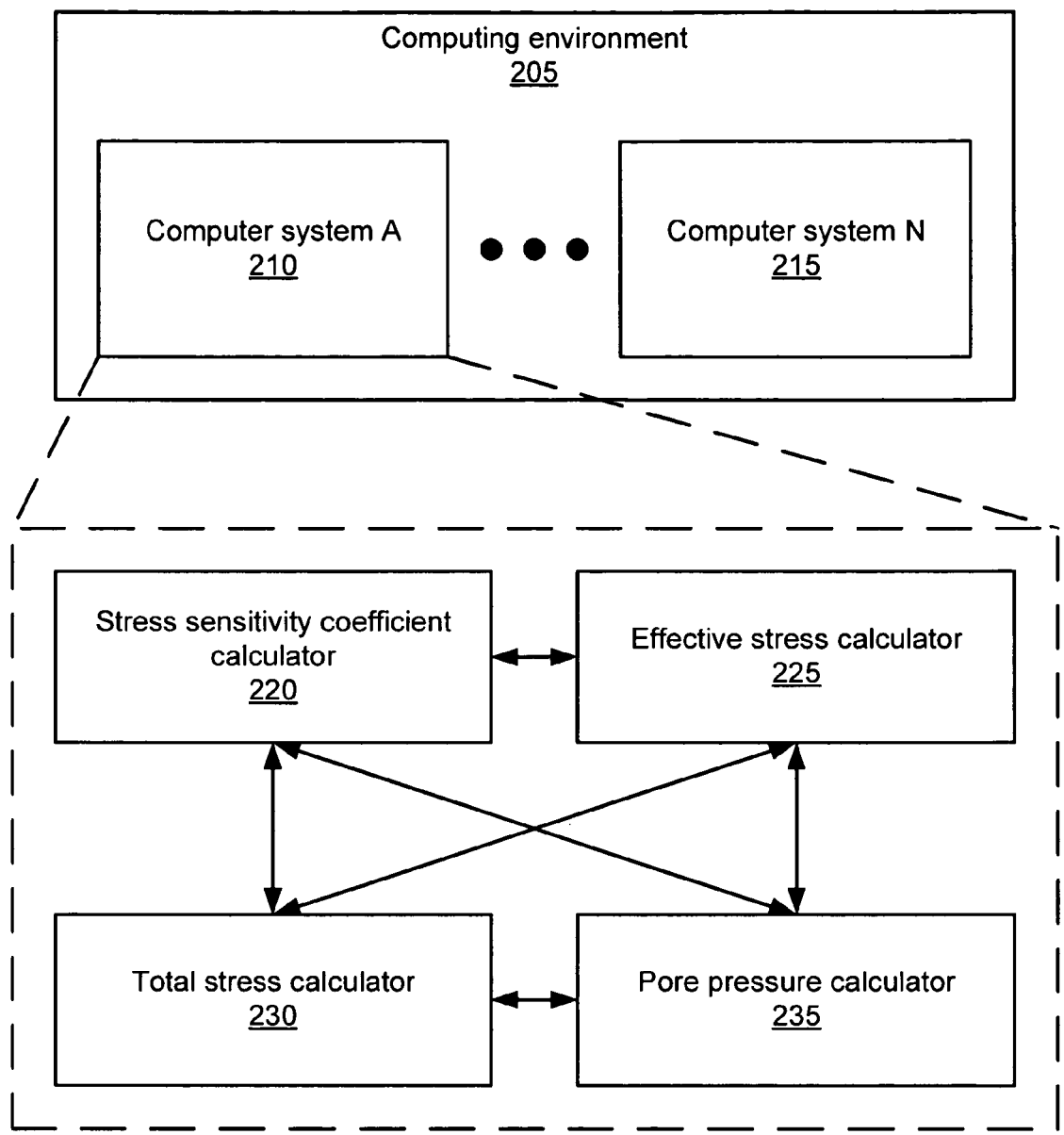
FIG. 2 shows a diagram of a system in accordance with one or more embodiments of the invention.

FIG. 2 shows a diagram of a system in accordance with one or more embodiments of the invention. Specifically, FIG. 2 shows a diagram of a computing environment (205) in accordance with one or more embodiments of the invention.

In one or more embodiments of the invention, the computing environment (205) may include one or more computer systems (e.g., computer system A (210), computer system N (215)) configured to perform drilling-related tasks. In one or more embodiments of the invention, the computer system(s) (e.g., 210, 215) may be web servers, embedded systems (e.g., a computer located in a downhole tool), desktop computers, laptop computers, personal digital assistants, any other similar type of computer system, or any combination thereof.

Specifically, in one or more embodiments of the invention, one or more of the computer systems (e.g., 210, 215) may include a stress sensitivity coefficient calculator (220), a total stress calculator (230), and/or a pore pressure calculator (235). In one or more embodiments of the invention, the aforementioned components (i.e., 220, 230, 235) may be located in a single computer system (e.g., 210, 215), distributed across multiple computer systems (e.g., 210, 215), or any combination thereof. In one or more embodiments of the invention, each of the aforementioned components (i.e., 220, 230, 235) may include one or more software modules, one or more hardware modules, or any combination thereof.

Further, in one or more embodiments of the invention, the aforementioned components (i.e., 220, 230, 235) may be configured to communicate with each other via function calls, application program interfaces (APIs), a network protocol (i.e., a wired or wireless network protocol), electronic circuitry, any other similar type of communication and/or communication protocol, or any combination thereof.

In one or more embodiments of the invention, the stress sensitivity coefficient calculator (220) may be configured to calculate at least one stress sensitivity coefficient using reference data. Calculating stress sensitivity coefficients using reference data is discussed below with respect to FIG. 3. In one or more embodiments of the invention, the total stress calculator (230) may be configured to calculate a total stress value associated with a pre-drill location using a predicted pore pressure. Calculating a total stress value is discussed below with respect to FIG. 3.

In one or more embodiments of the invention, the pore pressure calculator (235) may be configured to calculate a predicted pore pressure using the total stress value calculated by the total stress calculator. Further, in one or more embodiments of the invention, calculating the predicted pore pressure may involve using the stress sensitivity coefficient(s) calculated by the stress sensitivity coefficient calculator (220). Calculating a predicted pore pressure is discussed below with respect to FIG. 3.

Further, in one or more embodiments of the invention, once the pore pressure calculator (235) has calculated a predicted pore pressure, the total stress calculator (230) may use the predicted pore pressure to re-calculate the total stress value. The re-calculated total stress value may then be used by the pore pressure calculator (235) to re-calculate the predicted pore pressure. In one or more embodiments of the invention, the pore pressure calculator (235) and total stress calculator (230) may be configured to re-calculate the total stress value and the predicted pore pressure iteratively, until the predicted pore pressure meets a threshold condition. Iterative re-calculation of a total stress value and predicted pore pressure is discussed below with respect to FIG. 3.

Figure 3:
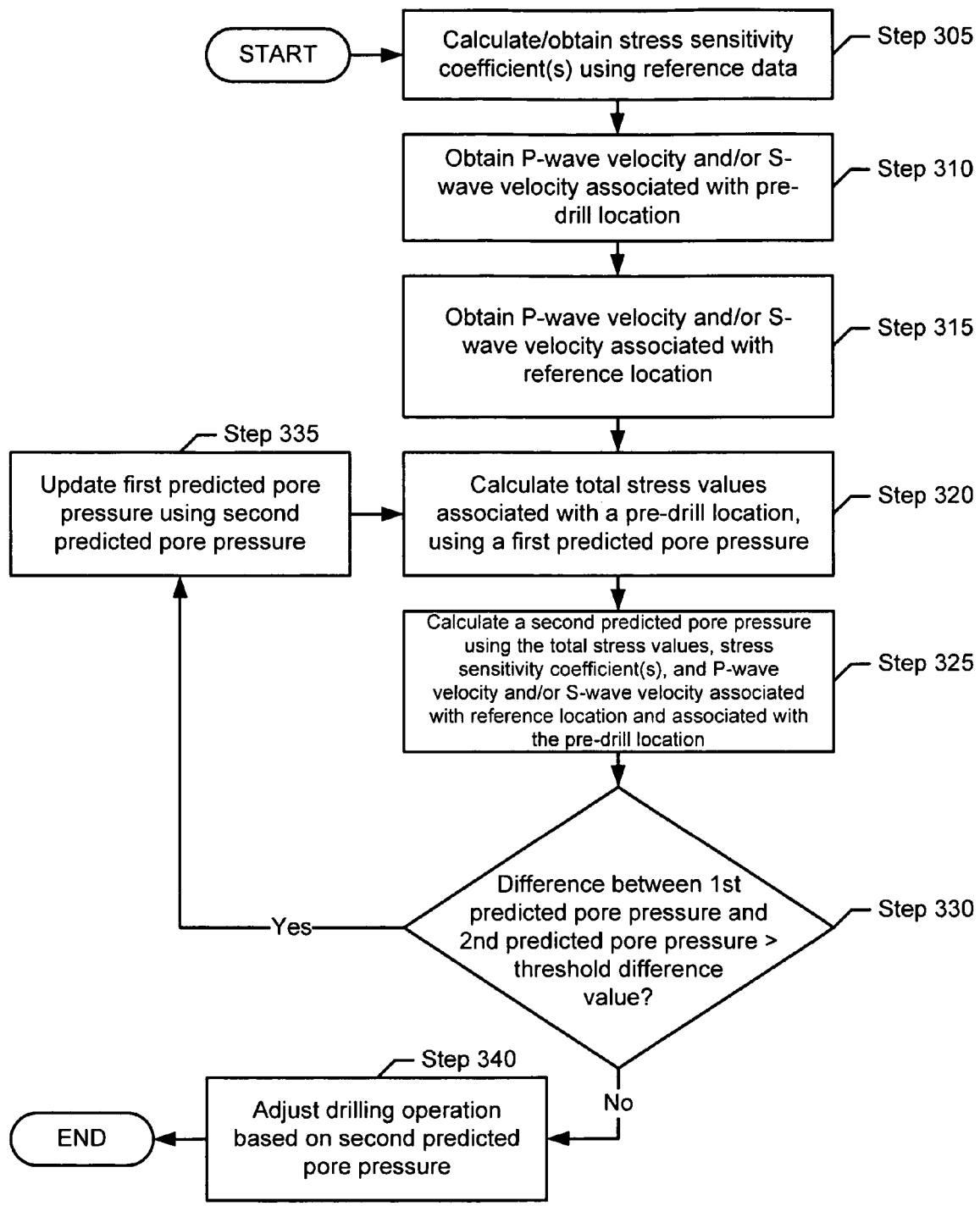
FIG. 3 shows a flowchart in accordance with one or more embodiments of the invention.

FIG. 3 shows a flowchart in accordance with one or more embodiments of the invention. Specifically, FIG. 3 shows a flowchart of a method for pre-drill pore pressure prediction in accordance with one or more embodiments of the invention.

In one embodiment of the invention, a pre-drill location corresponds to a location that has not yet been drilled. Said another way, the drill bit has not reached the pre-drill location, however, the pre-drill location is in the intended path of the drill bit and, unless the trajectory of the borehole changes, the drill bit will eventually reach the pre-drill location. In one embodiment of the invention, the method described in FIG. 3 may be performed while drilling, prior to drilling (i.e., prior to commencing the drilling of the borehole), or any combination thereof.

Turning to FIG. 3, one or more stress sensitivity coefficients may be calculated using reference data (Step 305). Specifically, in one or more embodiments of the invention, the reference data may include values associated with one or more reference locations. In one or more embodiments of the invention, the reference locations may include locations in one or more offset wells, simulated geologic formations, any other similar type of location, or any combination thereof.

In one or more embodiments of the invention, the reference data may include, but are not limited to total stress, effective stress, P-wave velocity, S-wave velocity, and pore pressure. The reference data may be obtained using sonic log measurements, ultrasonic measurements in a laboratory (see e.g., Winkler, K. W. & Xingzhou, L., 1996, *"Measurements of third-order Elastic Constants in Rocks"* J. Acoust. Soc. Am., Vol. 100, pp. 1392-1398), borehole seismic measurements, a vertical seismic profile (VSP), a computer simulation, any other method, or any combination thereof.

For example, the pore pressure at a location in an offset well may be obtained using the Modular Formation Dynamics Tester (MDT) tool or the Repeat Formation Tester (RFT) tool. Alternatively, the pore pressure may be obtained using a numerical model such as the one described in Malinverno, A. et al., 2004, *"Integrating Diverse Measurements to Predict Pore Pressure with Uncertainties While Drilling"* SPE Paper 90001.

Further, the total stress at the reference location may be obtained using a stress model. The following references describe various stress models that may be used with the invention: Lee, D., et al., 2003, *"Using a Dynamic Mechanical Earth Model and Integrated Drilling Team to Reduce Well Costs and Drilling Risks in San Martin Field"* SPE Paper No. 84557 and Moos, D. & Castillo, D. A., 2000, *"Reservoir Geomechanics Applied to Drilling and Completions Programs in challenging formations: North West shelf Timor Sea, North Sea and Columbia,"* APPEA Journal, February 16, pp. 509-521.

In one or more embodiments of the invention, the stress sensitivity coefficient(s) calculated in Step 305 may be coefficients that relate compressional wave (P-wave) and shear wave (S-wave) velocities associated with a location in a formation to effective stresses at the location. Accordingly, in one or more embodiments of the invention, the stress sensitivity coefficient(s) may be calculated using one or more stress-velocity relationship equations. The stress-velocity relationship equation(s) may be first-order, second-order, n-order (i.e., where n is any positive integer), or any combination thereof.

In one embodiment of the invention, the stress-velocity relationship equation(s) may include one or more of the following equations:

$$v_P(\sigma_V, \sigma_h) = v_P^{(0)} + \alpha_P^V \Delta\sigma_V + \alpha_P^h \Delta\sigma_h \quad (1)$$

$$v_S(\sigma_V, \sigma_h) = v_S^{(0)} + \alpha_S^V \Delta\sigma_V + \alpha_S^h \Delta\sigma_h, \quad (2)$$

where $\alpha_P^V$ is a vertical compressional stress sensitivity coefficient, $\alpha_P^h$ is a horizontal compressional stress sensitivity coefficient, $\alpha_S^V$ is a vertical shear stress sensitivity coefficient, and $\alpha_S^h$ is a horizontal shear stress sensitivity coefficient.

$\alpha_P^V$ is a coefficient that relates the change in the compressional wave (P-wave) velocity to the change in $\sigma_V$ (i.e., the effective vertical stress). $\alpha_P^h$ is a coefficient that relates the change in the compressional wave (P-wave) velocity to the change in $\sigma_h$ (i.e., the effective horizontal stress). $\alpha_S^V$ is a coefficient that relates the change in the shear wave (S-wave) velocity to the change in $\sigma_V$ (i.e., the effective vertical stress). $\alpha_S^h$ is a coefficient that relates the change in the shear wave (S-wave) velocity to the change in $\sigma_h$ (i.e., the effective horizontal stress).

In one or more embodiments of the invention, $v_P^{(0)}$, $v_S^{(0)}$, $\sigma_V$, and $\sigma_h$ may be related according to the following equations:

$$v_P^{(0)} = v_P(\sigma_V^{(0)}, \sigma_h^{(0)}) \quad (3)$$

$$v_S^{(0)} = v_S(\sigma_V^{(0)}, \sigma_h^{(0)}) \quad (4)$$

$$\sigma_V = \sigma_V^{(0)} + \Delta\sigma_V \quad (5)$$

$$\sigma_h = \sigma_h^{(0)} + \Delta\sigma_h \quad (6)$$

The aforementioned variables are defined as follows: $\sigma_V^{(0)}$ is an effective vertical stress value associated with a common reference location, $\sigma_h^{(0)}$ is an effective horizontal stress value associated with the common reference location, $\sigma_V$ is an effective vertical stress value associated with a location, $\sigma_h$ is an effective horizontal stress value associated with the location, $\Delta\sigma_V$ is the difference between the effective vertical stress value at the common reference location and the effective vertical stress value at the location, $\Delta\sigma_h$ is the difference between the effective horizontal stress value at the common reference location and the effective horizontal stress value at the location, $v_P^{(0)}$ is a reference P-wave velocity associated with the common reference location, $v_S^{(0)}$ is a reference S-wave velocity associated with the common reference location, $v_P(\sigma_V, \sigma_h)$ is a P-wave velocity associated with the location, and $v_S(\sigma_V, \sigma_h)$ is a S-wave velocity associated with the location.

Using equations (1)-(6), the following method may be used to obtain the stress sensitivity coefficients (i.e., $\alpha_P^V$, $\alpha_P^h$, $\alpha_S^V$, and $\alpha_S^h$). Initially, a common reference location (L0), a first location (L1), and a second location (L2) are selected. Those skilled in the art will appreciate that the terms "first" and "second" are used herein solely to distinguish values associated with one location from values associated with another location. Accordingly, no order should be implied from the use of these terms. Continuing with the example, L0, L1, and L2 may be located at different depths within the offset well. In one embodiment of the invention, L0 is located at the top of a formation in the offset well. Alternatively, L0, L1, and L2 may be located at a common depth but at different distances from the axis of the borehole of the offset well. For example, L0, L1, and L2 may be located at 10,000 feet below the seafloor, where L0 is located on the borehole wall, L1 is located 3 inches into the formation measured along a line perpendicular to the borehole axis, and L2 is located 6 inches into the formation measured along a line perpendicular to the borehole axis.

In one embodiment of the invention, the formation at L0, L1, and L2 includes substantially similar physical properties (e.g., lithology, porosity, etc.). The similarity of physical properties may be verified using core data or logs (e.g., resistivity logs, neutron porosity logs, density logs, nuclear magnetic resonance logs, etc.).

Once L0, L1, and L2 have been selected, $v_P(\sigma_V, \sigma_h)$ and $v_S(\sigma_V, \sigma_h)$ are obtained for each of the locations (i.e., L0, L1, and L2). In one or more embodiments of the invention, the P-wave and S-wave velocities may be obtained using a look-ahead walkaway vertical seismic profile (VSP). In one embodiment of the invention, the VSP is a multi-azimuth walkaway VSP. Further discussion of multi-azimuth VSPs may be found in Leaney, W. S., Sayers, C. M., and Miller, D. E., 1999, *"Analysis of Multiazimuthal VSP Data for Anisotropy and AVO,"* Geophysics, 64, 1172-1180.

Alternatively, P-wave and S-wave velocities may be obtained using a borehole sonic tool as described in Harrison, A. R., 1990, *"Acquisition and Analysis of Sonic Waveforms from a Borehole Monopole and Dipole Source and the Determination of Compressional and Shear Speeds and their Relation to Rock Mechanical Properties and Surface Seismic Data."* SPE Paper No. 20557, 267-282. Additional methods for obtaining P-wave and S-wave velocities as functions of distance from the borehole axis are described in U.S. Pat. Nos. 5,838,633 and 6,904,365. All of the aforementioned patents are commonly owned by the assignee of the present application.

Alternatively, in one or more embodiments of the invention, the P-wave and S-wave velocities may be obtained using a multi-component seismic survey (e.g., a 3C survey, a 4C survey, etc.). For example, the multi-component seismic survey may be performed on land using P-wave and S-wave vibrators, P-wave and S-wave receivers, or any combination thereof. As another example, the multi-component seismic survey may be performed in a marine environment using P-wave and S-wave sensors on the seafloor.

As another alternative, in one or more embodiments of the invention, the P-wave and S-wave velocities may be obtained using PP and SS reflections, PP and PS reflections (e.g., in cases when an S-wave receiver is available, but no S-wave source is available), any other similar type of method, or any combination thereof. Further, in one or more embodiments of the invention, the P-wave and S-wave velocities may be obtained by inverting amplitude-versus-offset (AVO) data associated with PP reflections. Similarly, in one or more embodiments of the invention, AVO data associated with PS reflections and SS reflections may be used.

Returning to the discussion of using equations (1)-(6) to determine the stress sensitivity coefficient, the pore pressure is obtained at each of the locations (i.e., L0, L1, L2). As discussed above, pore pressure may be obtained using various downhole tools or numerical methods. In addition, the total stress, which is also expressed as a tensor, is also obtained for each location (i.e., L0, L1, L2).

Using the pore pressure and the total stress at each of the locations, the effective stress at each of the locations may be determined. In one embodiment of the invention, the effective stress ($\sigma$) is defined as the difference between the total stress and the pore pressure expressed as a tensor. The aforementioned effective stresses ($\sigma$) along with equations (5) and (6) are then used to determine $\Delta\sigma_V$ and $\Delta\sigma_h$ at L1 and L2. The values of $v_P(\sigma_V, \sigma_h)$, $v_S(\sigma_V, \sigma_h)$, $\Delta\sigma_V$, and $\Delta\sigma_h$ for L1 and L2 are the used to create four equations (two equations corresponding to equation (1) and two equations corresponding to equation (2)). At this stage, there four equations and four unknowns (i.e., $\alpha_P^V$, $\alpha_P^h$, $\alpha_S^V$, and $\alpha_S^h$) and, accordingly, the equations may be rearranged and solved to obtain the values of $\alpha_P^V$, $\alpha_P^h$, $\alpha_S^V$, and $\alpha_S^h$.

In one embodiment of the invention, equations (1) and (2) may be used in situations where the minimum horizontal stress and the maximum horizontal stress are equal or substantially the same. However, in cases where the minimum horizontal stress and the maximum horizontal stress are not equal or substantially the same, the following expanded version of equations (1) and (2) may be used:

$$v_P(\sigma_V, \sigma_h, \sigma_H) = v_P^{(0)} + \alpha_P^V \Delta\sigma_V + \alpha_P^h \Delta\sigma_h + \alpha_P^H \Delta\sigma_H \quad (7)$$

$$v_{S1}(\sigma_V, \sigma_h, \sigma_H) = v_{S1}^{(0)} + \alpha_{S1}^V \Delta\sigma_V + \alpha_{S1}^h \Delta\sigma_h + \alpha_{S1}^H \Delta\sigma_H, \quad (8)$$

$$v_{S2}(\sigma_V, \sigma_h, \sigma_H) = v_{S2}^{(0)} + \alpha_{S2}^V \Delta\sigma_V + \alpha_{S2}^h \Delta\sigma_h + \alpha_{S2}^H \Delta\sigma_H, \quad (9)$$

Those skilled in the art will appreciate that when $S_H$ and $S_h$ are not equal, there are two shear waves with different polarizations having different velocities.

In one or more embodiments of the invention, the stress sensitivity coefficient(s) may be obtained by applying a micromechanical model to the reference data. For example, a micromechanical model may be used that accounts for the stress-dependence and orientation distribution of the contacts between grains (e.g., in a sand formation). Further discussion of micromechanical models may be found in Sayers, C. M., 2002, *"Stress-dependent elastic anisotropy of sandstones,"* Geophysical Prospecting, 50, 85-95, and Sayers, C. M. (1999) Stress-dependent seismic anisotropy of shales, Geophysics, 64, 93-98.

In some cases, the vertical stress may not be a principal stress. In such cases, more general forms of the equations (1) and (2) relating effective stress to the P-wave and S-wave velocities may be used. For example, equations (1) and (2) may include shear stress components or principal stress components that are not aligned parallel or perpendicular to the vertical axis (with respect to a gravity vector).

Additional methods for obtaining stress sensitivity coefficient(s) are described in U.S. Pat. Nos. 7,042,802; 6,351,991; 5,838,633; 5,619,475; 5,475,650; and 5,398,215. All of the aforementioned patents are commonly owned by the assignee of the present application.

Those skilled in the art will appreciate that the exemplary stress-pressure relationship in equations (1) and (2) relies on the fact that while vertically propagating P-waves are mostly sensitive to changes in the component of the effective stress acting parallel to the direction of propagation, S-waves are sensitive to changes in both the component of the effective stress acting parallel to the direction of propagation and the component of the effective stress acting parallel to the direction of polarization. Further discussion of these underlying facts can be found in Sayers, C. M., 2004, *"Monitoring production-induced stress changes using seismic waves,"* 74th SEG Annual Meeting, Extended Abstracts. Specifically, since the directions of propagation and polarization are approximately parallel for the P-wave and orthogonal for the S-wave, the combination of the P-wave and S-wave velocities allows perpendicular components of the effective stress to be determined separately, thus allowing a determination of the pore pressure, and principal stresses.

Continuing with discussion of FIG. 3, in one or more embodiments of the invention, in Step 310, P-wave and/or S-wave velocities associated with the pre-drill location may be obtained using one or more of the methods described above. In one embodiment of the invention, P-wave and/or S-wave velocities may be obtaining using multi-offset Vertical Seismic Profile (VSP), often referred to as a walkaway VSP. In such cases, the VSP may be acquired using shots arranged on a line designed to maximize the extraction of information about the principal stresses. A multi-offset, multi-azimuth VSP may also be used.

Continuing with discussion of FIG. 3, in one or more embodiments of the invention, in Step 315, P-wave and/or S-wave velocities associated with a reference location may be obtained using one or more of the methods described above.

In Step 320, total stress values associated with the pre-drill location may be calculated, using a predicted pore pressure. Specifically, in one or more embodiments of the invention, the first time that Step 320 is performed, the predicted pore pressure may be obtained from an offset well, a computer simulation, or any other source. For example, the predicted pore pressure may be obtained using a velocity-to-pore-pressure transform on offset well data. Further discussion of velocity-to-pore-pressure transforms can be found in Eaton, "*The Equation for Geopressure Prediction from Well Logs*," SPE 5544 (Society of Petroleum Engineers of AIME, 1975) and Bowers, "*Pore Pressure Estimation from Velocity Data: Accounting for Pore-Pressure Mechanisms besides Undercompaction*," SPE Drilling and Completion (June 1995) 89-95.

In one or more embodiments of the invention, calculating total stress values may involve performing a finite element analysis that includes the pre-drill location and surrounding formations. For example, a finite element model used in the finite element analysis may include the pre-drill location and one or more locations in one or more offset wells. Performing the finite element analysis may also involve calculating a total stress variation across one or more depths (e.g., above, below, and/or around the low permeability substance) using the predicted pore pressure. For example, boundary stress conditions may be obtained from offset wells and used to estimate total stress values at the pre-drill location. Further discussion of finite element analysis can be found in Fredrich, J. T., et al., 2003, "*Stress Perturbations Adjacent to Salt Bodies in Deepwater Gulf of Mexico.*" SPE Paper No. 84554.

Alternatively, a finite difference or any other similar numerical method may be used. The following article discusses a numerical method that may be used instead of the aforementioned finite element method: Poliakov, A. N. B. et al., 1993, "*An Explicit Inertial Method for the Simulation of Viscoelastic Flow: An Evaluation of Elastic Effects on Diapiric Flow in Two-and Three-layer Models*," Stone, D. B. & Runcom, S. K. (eds.) Flow and Creep in the Solar System: Observations, Modeling and Theory, pp. 175-195.

Continuing with discussion of FIG. 3, in one or more embodiments of the invention, in Step 325 a second predicted pore pressure is calculated using the total stress values obtained in Step 320. The following discussion details an embodiment for obtaining the second predicted pore pressure.

Initially, a reference location is selected. The reference location used in Step 325 may be the common reference location used in Step 305 or it may be another location in one of the offset wells or in the target borehole (i.e., the borehole whose current trajectory intersects with the pre-drill location). In one embodiment of the invention, the reference location and the pre-drill location include substantially similar physical properties (e.g., lithology, porosity, etc.). The similarity of physical properties may be verified using logs (e.g., resistivity logs, porosity logs, density logs, magnetic resonance logs, etc.).

The relationship between the effective stress, the total stress, and the pore pressure is given by the following equation:

$$\sigma_{ij} = S_{ij} - \alpha p \delta_{ij}, \quad (10)$$

where i and j refer to components of a tensor, $\alpha_{ij}$ is the effective stress component, $S_{ij}$ is the total stress component, $\alpha$ is a poroelastic coefficient, $\delta_{ij}$ is 1 if i=j, and $\delta_{ij}$ is 0 if i≠j. $\alpha$ may be obtained using a variety of methods such as those described in Wang. H F., 2000, "*Theory of Linear Poroelasticity—with Applications to Geomechanics and Hydrogeology*" Princeton University Press. 287 pp. Those skilled in the art will appreciate that methods described in the aforementioned references are not intended to limit the scope of the invention. Continuing with the discussion of Step 325, replacing the effective stress in equations (1) or (2) using equation (8) yields $$v_P(S_V, S_h, p) = v_P^{(0)} + \alpha_P^V(\Delta S_V - \alpha \Delta p) + \alpha_P^h(\Delta S_h - \alpha \Delta p) \quad (11)$$

$$v_S(S_V, S_h, p) = v_S^{(0)} + \alpha_S^V(\Delta S_V - \alpha \Delta p) + \alpha_S^h(\Delta S_h - \alpha \Delta p), \quad (12)$$

With respect to the reference, the variables in equations (11)-(12) are defined as follows: $v_P(S_V, S_h, p)$ is the P-wave velocity associated with the pre-drill location, and $v_S(S_V, S_h, p)$ is the S-wave velocity associated with the pre-drill location; $v_P^{(0)}$ is a reference P-wave velocity associated with the reference location; $v_S^{(0)}$ is a reference S-wave velocity associated with the reference location; $\alpha_P^V$ is the vertical compressional stress sensitivity coefficient obtained in Step 305; $\alpha_P^h$ is the horizontal compressional stress sensitivity coefficient obtained in Step 305; $\alpha_S^V$ is the vertical shear stress sensitivity coefficient obtained in Step 305; $\alpha_S^h$ is the horizontal shear stress sensitivity coefficient obtained in Step 305; $S_v$ is the total vertical stress; $S_h$ is the total horizontal stress; p is the pore pressure; the terms preceded by $\Delta$ represent the difference between values at the pre-drill location and the reference location; and $\alpha$ is the poroelastic coefficient.

Using equation (11) and/or equation (12) with values obtained in the previous steps, $\Delta p$ may be determined. $\Delta p$ may then be added to the pore pressure at the reference location to obtain the second predicted pore pressure.

Continuing with discussion of FIG. 3, in one or more embodiments of the invention, in Step 330, the predicted pore pressure used in Step 320 (hereinafter the "first" predicted pore pressure) may be compared with the predicted pore pressure calculated in Step 325 (hereinafter the "second" predicted pore pressure). Specifically, one or more metrics of the differences between the first and second predicted pore pressures may be compared with one or more threshold difference values. In one or more embodiments of the invention, a threshold difference value may be a maximum value of the metric of differences indicating that the second predicted pore pressure is sufficiently accurate. In one embodiment of the invention, a second predicted pore pressure is determined to be sufficiently accurate when

|(PP1−PP2)/PP1|≦0.001, where PP1 denotes the first predicted pore pressure and PP2 denotes the second predicted pore pressure. Those skilled in the art would appreciate that other values for the threshold difference value may be used and that other mathematical constructs for the metric of the differences may be used. The threshold difference value may correspond to any other value less than 1.

In one or more embodiments of the invention, if the differences between the first and second predicted pore pressures are greater than the threshold difference value in Step 330, then in Step 335 the first predicted pore pressure is updated using the second predicted pore pressure. In this case, Step 320 is subsequently repeated using the first updated predicted pore pressure. In one or more embodiments of the invention, if Step 320-325 are repeated, current data gathered while drilling may be used (e.g., seismic wave velocities, stress data, etc.). For example, the current data may be gathered using measurements while drilling (MWD), logging while drilling (LWD), any other similar type of drilling data, or any combination thereof. Those skilled in the art will appreciate that using more current data and/or data from a location closer to the pre-drill location may improve the accuracy of the calculated total stress value. Further, those skilled in the art will appreciate that "updating" the first predicted pore pressure may simply imply that Step 320 is repeated using the predicted pore pressure calculated in Step 325.

In one or more embodiments of the invention, Steps 320 and 325 may be iteratively performed (i.e., via Steps 330 and 335) until the difference between the first and second predicted pore pressures are less than or equal to the threshold difference values in Step 330. Said another way, Steps 320 and 325 may be repeated until the first and second predicted pore pressures have sufficiently converged (e.g., the difference between the first and second predicted pore pressure is ≦0.1%.).

In one or more embodiments of the invention, if the differences between the first and second predicted pore pressures are less than or equal to the threshold difference value(s) in Step 330, then in Step 340 the drilling operation associated with the pre-drill location may be adjusted based on the second predicted pore pressure. Specifically, in one or more embodiments of the invention, adjusting the drilling operation may involve adjusting a drilling fluid density (i.e., increasing or decreasing the drilling fluid density as appropriate), adjusting a drilling trajectory (e.g., to avoid an overpressured area, to pass through a low-pressure area, etc.), optimizing the number of casing strings in the borehole (i.e., adding a casing string, delaying addition of a casing string, etc.), or any other similar type of adjustment.

In one embodiment of the invention, if a proposed well trajectory is situated in the vicinity of a complex structure that perturbs the surrounding stress-field (e.g., salt) and the proposed well trajectory passes through a highly permeable formation (e.g., sand), then the pore pressure in the highly permeable formation may be determined using any of the available techniques for determining pore pressure in such a formation.

For example, if shale (a low permeability substance) interfaces with a sand (a high permeability), then an offset well may be drilled in the shale and the pore pressure in the shale may be determined using, for example, acoustic or seismic velocities. The pore pressure in the shale may then be used to obtain the pore pressure in the sand using, for example, the centroid method. A particular version of the centroid method is described in the Patent Cooperation Treaty (PCT) Application with the serial number WO 2004/022905 and assigned to the assignee of the present application. Alternatives to the centroid method include numerical basin modeling. Once the pore pressure in the sand has been determined, the pore pressure may be used to validate the various stress sensitivity coefficients and/or the model used to generate the total stress at the pre-drill location.

In one embodiment of the invention, wireline and/or logging while drilling (LWD) tools are used to obtain pore pressure measurements for a location in an offset well, where the location is in a sand and the sand extends to a pre-drill location. In such cases, the pore pressure at the pre-drill location may be estimated using the pore pressure obtained at the location in the offset well and information about the hydrostatic gradient (defined by the fluid density) between the location in the offset well and the pre-drill location. Once the pore pressure in the sand has been determined at the pre-drill location, the pore pressure may be used to validate the various stress sensitivity coefficients and/or the model used to generate the total stress at the pre-drill location.

In one embodiment of the invention, downhole measurements obtained while drilling in the target borehole (i.e., the borehole whose trajectory intersects with the pre-drill location) may be used to update the stress sensitivity coefficients and/or the model used to generate the total stress at the pre-drill location. These coefficients may then be used to predict the pore pressure ahead of the bit using seismic velocities or velocities obtained using a multi-offset VSP.

One or more embodiments of the invention provide a means for accurately predicting a pre-drill pore pressure. Accordingly, one or more embodiments of the invention may prevent formation fluids from entering a borehole, thereby preventing damage to the well and/or personnel operating a drilling rig. Further, one or more embodiments of the invention may prevent the financial overhead of prematurely inserting casing strings.

Figure 4:
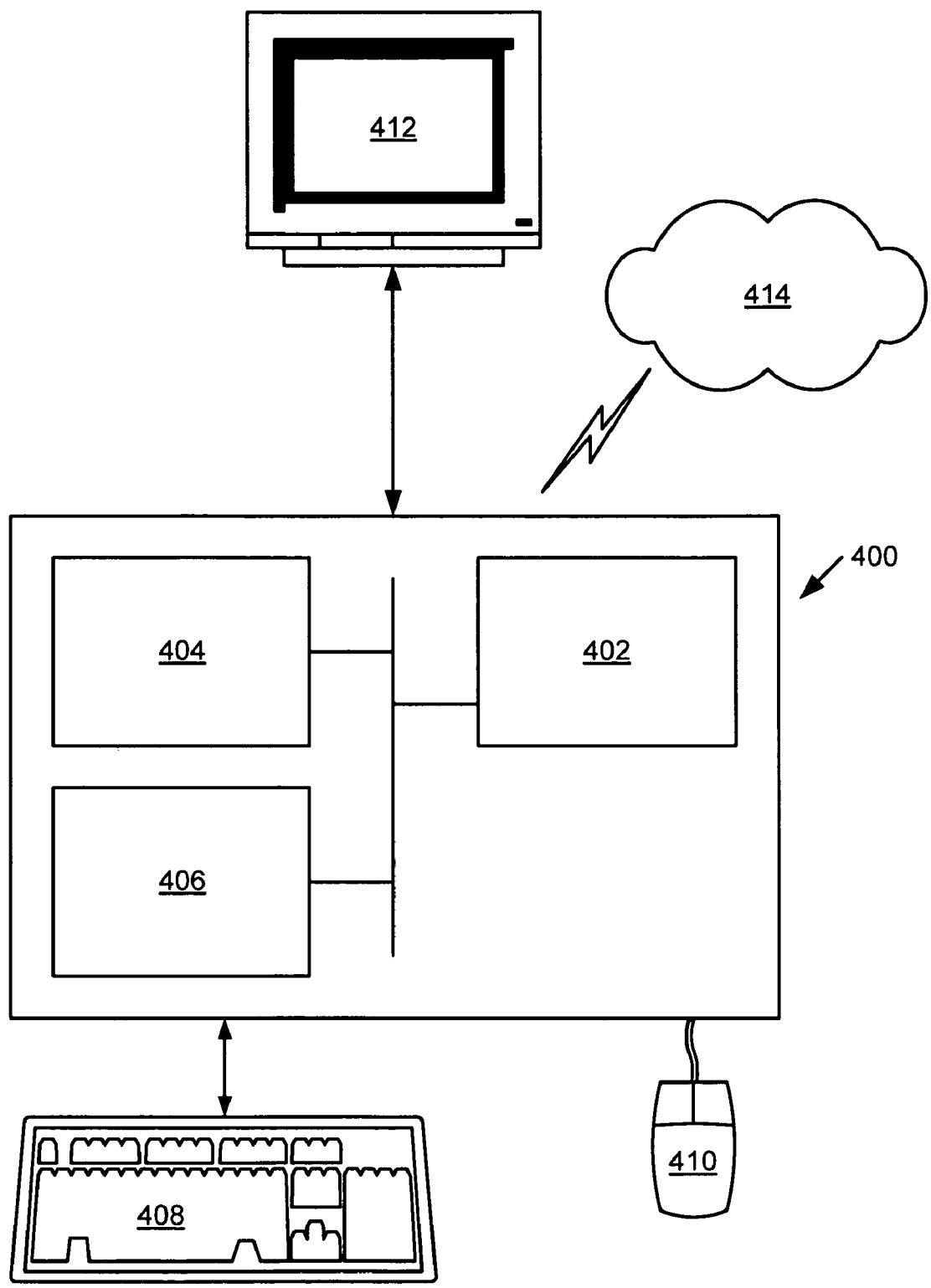
FIG. 4 shows a diagram of a computer system in accordance with one or more embodiments of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) may be connected to a network (414) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., stress sensitivity coefficient calculator, total stress calculator, pore pressure calculator, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device. In addition, in one embodiment of the invention, the predicted pore pressure (including all the pore pressures calculated using the method described in FIG. 3) may be displayed to a user via a graphical user interface (e.g., a display device).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for pore pressure prediction, comprising:
   obtaining a stress sensitivity coefficient;
   obtaining a compressional wave (P-wave) velocity and a shear wave (S-wave) velocity for a pre-drill location;
   obtaining a first predicted pore pressure;
   iteratively performing:
      calculating a total stress value associated with the pre-drill location using the first predicted pore pressure associated with the pre-drill location; and
      calculating a second predicted pore pressure associated with the pre-drill location using a stress-pressure relationship equation, a stress-velocity relationship equation, the stress sensitivity coefficient, a reference location, and at least one selected from a group consisting of the P-wave velocity and the S-wave velocity for the pre-drill location,
   wherein iterating is complete if a difference between the first predicted pore pressure and the second predicted pore pressure is less than or equal to a threshold difference value, and
   wherein the first predicted pore pressure is updated using the second predicted pore pressure if the difference is greater than the threshold difference value; and
   adjusting a drilling operation associated with the pre-drill location, based on the second predicted pore pressure.

2. The method of claim 1, wherein obtaining the stress sensitivity coefficient is performed using the stress-velocity relationship equation, a first location in an offset well, a second location in the offset well, and a common reference location.

3. The method of claim 2, wherein the common reference location is located in the offset well.

4. The method of claim 2, wherein the first location comprises a first depth in an offset well and the second location comprises a second depth in the offset well.

5. The method of claim 2, wherein the stress-velocity relationship equation comprises at least one selected from a group consisting of:

$$v_P(\sigma_V, \sigma_h) = v_P^{(0)} + \alpha_P^V \Delta\sigma_V + \alpha_P^h \Delta\sigma_h \text{ and}$$

$$v_S(\sigma_V, \sigma_h) = v_S^{(0)} + \alpha_S^V \Delta\sigma_V + \alpha_S^h \Delta\sigma_h,$$

wherein
$v_P^{(0)} v_P(\sigma_V^{(0)}, \sigma_h^{(0)})$, $v_S^{(0)} = v_S(\sigma_V^{(0)}, \sigma_h^{(0)})$, $\sigma_V = \sigma_V^{(0)} + \Delta\sigma_V$, $\sigma_h = \sigma_h^{(0)} + \Delta\sigma_h$, and wherein to calculate the stress sensitivity coefficient:

$\sigma_V^{(0)}$ is an effective vertical stress value associated with the common reference location, $\sigma_h^{(0)}$ is an first effective minimum horizontal stress value associated with the common reference location, $\sigma_V$ is an effective vertical stress value associated with one selected from a group consisting of the first location and the second location, $\sigma_h$ is an effective minimum horizontal stress value associated one selected from a group consisting of the first location and the second location, $\Delta\sigma_V$ is a difference between one selected from a group consisting of the first location and the second location and the effective vertical stress value at the common reference location, $\Delta\sigma_h$ is a difference between one selected from a group consisting of the first location and the second location and the effective minimum horizontal stress value at the common reference location, $v_P^{(0)}$ is a reference P-wave velocity associated with the common reference location, $v_S^{(0)}$ is a reference S-wave velocity associated with the common reference location, $\alpha_P^V$ is a vertical compressional stress sensitivity coefficient, $\alpha_P^h$ is a minimum horizontal compressional stress sensitivity coefficient, $\alpha_S^V$ is a vertical shear stress sensitivity coefficient, $\alpha_S^h$ is a minimum horizontal shear stress sensitivity coefficient, $v_P(\sigma_V, \sigma_h)$ is a reference P-wave velocity associated with the one selected from a group consisting of the first location and the second location, and $v_S(\sigma_V, \sigma_h)$ is a reference S-wave velocity associated with the one selected from a group consisting of the first location and the second location, and
wherein the stress sensitivity coefficient is one selected from a group consisting of $\alpha_P^V$, $\alpha_P^h$, $\alpha_S^V$, and $\alpha_S^h$.

6. The method of claim 2, wherein the stress-velocity relationship equation comprises at least one selected from a group consisting of:

$$v_P(\sigma_V, \sigma_h, \sigma_H) = v_P^{(0)} + \alpha_P^V \Delta\sigma_V + \alpha_P^h \Delta\sigma_h + \alpha_P^H \Delta\sigma_H,$$

$$v_{S1}(\sigma_V, \sigma_h, \sigma_H) = v_{S1}^{(0)} + \alpha_{S1}^V \Delta\sigma_V + \alpha_{S1}^h \Delta\sigma_h + \alpha_{S1}^H \Delta\sigma_H,$$
and $$v_{S2}(\sigma_V, \sigma_h, \sigma_H) = v_{S2}^{(0)} + \alpha_{S2}^V \Delta\sigma_V + \alpha_{S2}^h \Delta\sigma_h + \alpha_{S2}^H \Delta\sigma_H,$$

wherein
$v_P^{(0)} = v_P(\sigma_V^{(0)}, \sigma_h^{(0)})$, $v_{S1}^{(0)} = v_{S1}(\sigma_V^{(0)}, \sigma_h^{(0)})$, $v_{S2}^{(0)} = v_{S2}(\sigma_V^{(0)}, \sigma_h^{(0)})$, $\sigma_V = \sigma_V^{(0)} + \Delta\sigma_V$, $\sigma_h = \sigma_h^{(0)} + \Delta\sigma_h$, $\sigma_H = \sigma_H^{(0)} + \Delta\sigma_H$
and
wherein to calculate the stress sensitivity coefficient:
$\sigma_V^{(0)}$ is an effective vertical stress value associated with the common reference location, $\sigma_h^{(0)}$ is an first effective minimum horizontal stress value associated with the common reference location, $\sigma_H^{(0)}$ is an first effective maximum horizontal stress value associated with the common reference location,
$\sigma_V$ is an effective vertical stress value associated with one selected from a group consisting of the first location and the second location, $\sigma_h$ is an effective minimum horizontal stress value associated one selected from a group consisting of the first location and the second location, $\sigma_H$ is an effective maximum horizontal stress value associated one selected from a group consisting of the first location and the second location, $\Delta\sigma_V$ is a difference between one selected from a group consisting of the first location and the second location and the effective vertical stress value at the common reference location, $\Delta\sigma_h$ is a difference between one selected from a group consisting of the first location and the second location and the effective minimum horizontal stress value at the common reference location, $\Delta\sigma_H$ is a difference between one selected from a group consisting of the first location and the second location and the effective maximum horizontal stress value at the common reference location, $v_P^{(0)}$ is a reference P-wave velocity associated with the common reference location, $v_{S1}^{(0)}$ is a first reference S-wave velocity associated with the common reference location, $v_{S2}^{(0)}$ is a second reference S-wave velocity associated with the common reference location, $\alpha_P^V$ is a vertical compressional stress sensitivity coefficient, $\alpha_P^h$ is a minimum horizontal compressional stress sensitivity coefficient, $\alpha^{pH}$ is a maximum horizontal compressional stress sensitivity coefficient, $\alpha_{S1}^V$ is a first vertical shear stress sensitivity coefficient, $\alpha_{S2}^V$ is a second vertical shear stress sensitivity coefficient, $\alpha_{S1}^h$ is a first minimum horizontal shear stress sensitivity coefficient, $\alpha_{S2}^h$ is a second minimum horizontal shear stress sensitivity coefficient, $\alpha_{S1}^H$ is a first maximum horizontal shear stress sensitivity coefficient, $\alpha_{S2}^H$ is a second maximum horizontal shear stress sensitivity coefficient, $v_P(\sigma_V, \sigma_h, \sigma_H)$ is a reference P-wave velocity associated with the one selected from a group consisting of the first location and the second location, $v_{S1}(\sigma_V, \sigma_h, \sigma_H)$ is a first reference S-wave velocity associated with the one selected from a group consisting of the first location and the second location, and $v_{S2}(\sigma_V, \sigma_h, \sigma_H)$ is a second reference S-wave velocity associated with the one selected from a group consisting of the first location and the second location, wherein the shear wave comprises the first reference S-wave velocity and the second reference S-wave velocity, and wherein the stress sensitivity coefficient is one selected from a group consisting of $\alpha_P^V$, $\alpha_P^h$, $\alpha_P^H$, $\alpha_{S1}^V$, $\alpha_{S1}^h$, $\alpha_{S1}^H$, $\alpha_{S2}^V$, $\alpha_{S2}^h$, and $\alpha_{S2}^H$.

7. The method of claim 2, wherein at least one selected from a group consisting of the common reference location, the first location in the offset well, and the second location in the offset well comprises physical properties that are substantially similar to the pre-drill location.

8. The method of claim 2, wherein calculating the total stress value comprises using a numerical model, wherein the numerical model calculates the total stress value in a volume that includes the pre-drill location and at least one selected from a group consisting of the common reference location, the first location in the offset well, and the second location in the offset well.

9. The method of claim 1, wherein the pre-drill location is located below a low permeability substance.

10. The method of claim 9, wherein the low permeability substance is salt.

11. The method of claim 1, wherein calculating the stress sensitivity coefficient comprises using a micromechanical model.

12. The method of claim 1, wherein obtaining the P-wave velocity and the S-wave velocity comprises performing a look-ahead walkaway vertical seismic profile (VSP).

13. The method of claim 1, wherein the stress sensitivity coefficient is validated by obtaining an alternate pore pressure at the pre-drill location using a pore pressure at a location in an offset well, information about a hydrostatic gradient between the location in the offset well and the pre-drill location, wherein the location in the offset well is located in a high permeability substance and the high permeability substance extends to the pre-drill location.

14. The method of claim 1, wherein the stress sensitivity coefficient is validated by obtaining an alternate pore pressure at the pre-drill location, wherein the alternate pore pressure is determined using a pore pressure in an offset well and a centroid method, and wherein the location in the offset well is located in a low permeability substance, the pre-drill location is located in a high permeability substance, and the low permeability substance interfaces with the high permeability substance.

15. The method of claim 1, wherein the stress-pressure relationship equation is $$\sigma_{ij} = S_{ij} - \alpha p \delta_{ij},$$

wherein i and j refer to components of a tensor, $\sigma_{ij}$ is an effective stress component, $S_{ij}$ is a total stress component, $\alpha$ is a poroelastic coefficient, $\delta_{ij}$ is 1 if i=j, and $\delta_{ij}$ is 0 if i≠j.

16. The method of claim 1, wherein the second pore pressure is calculated using at least one equation selected from the group consisting of:

$$v_P(S_V, S_h, p) = v_P^{(0)} + \alpha_P^V(\Delta S_V - \alpha \Delta p) + \alpha_P^h(\Delta S_h - \alpha \Delta p)$$

$$v_S(S_V, S_h, p) = v_S^{(0)} + \alpha_S^V(\Delta S_V - \alpha \Delta p) + \alpha_S^h(\Delta S_h - \alpha \Delta p)$$

wherein $v_P(S_V, S_h, p)$ is the P-wave velocity associated with the pre-drill location, and $v_S(S_V, S_h, p)$ is the S-wave velocity associated with the pre-drill location, $v_P^{(0)}$ is a reference P-wave velocity associated with the reference location, $v_S^{(0)}$ is a reference S-wave velocity associated with the reference location, $S_v$ is a total vertical stress obtained from the total stress value, $S_h$ is a total minimum horizontal stress obtained from the total stress value, p corresponds to one selected from the group consisting of the first predicted pore pressure, the second pore pressure, and a pore pressure at the reference location, and $\alpha$ is a poroelastic coefficient, and wherein terms preceded by $\Delta$ represent the difference between values at the pre-drill location and the reference location.

17. The method of claim 1, wherein adjusting the drilling operation comprises at least one selected from a group consisting of adjusting a drilling fluid density, adjusting a drilling trajectory, and optimizing a number of casing strings in a borehole.

18. The method of claim 1, wherein the pre-drill location comprises a location below an operating drill bit in a borehole.

19. The method of claim 1, wherein in the first predicted pore pressure and the second pore pressure are displayed on a graphical user interface.

20. A computer readable medium comprising instructions to perform a method for pore pressure prediction, the method comprising:

obtaining a stress sensitivity coefficient;

obtaining a compressional wave (P-wave) velocity and a shear wave (S-wave) velocity for a pre-drill location;

obtaining a first predicted pore pressure;

iteratively performing:
  calculating a total stress value associated with the pre-drill location using the first predicted pore pressure associated with the pre-drill location, and
  calculating a second predicted pore pressure associated with the pre-drill location using a stress-pressure relationship equation, a stress-velocity relationship equation, the stress sensitivity coefficient, a reference location, and at least one selected from a group consisting of the P-wave velocity and the S-wave velocity for the pre-drill location;

wherein iterating is complete if a difference between the first predicted pore pressure and the second predicted pore pressure is less than or equal to a threshold difference value, and wherein the first predicted pore pressure is updated using the second predicted pore pressure if the difference is greater than the threshold difference value; and adjusting a drilling operation associated with the pre-drill location, based on the second predicted pore pressure.

21. The computer readable medium of claim 20, wherein obtaining the stress sensitivity coefficient is performed using the stress-velocity relationship equation, a first location in an offset well, a second location in the offset well, and a common reference location.

22. The computer readable medium of claim 21, wherein the common reference location is located in the offset well.

23. The computer readable medium of claim 21, wherein the first location comprises a first depth in an offset well and the second location comprises a second depth in the offset well.

24. The computer readable medium of claim 21, wherein the stress-velocity relationship equation comprises at least one selected from a group consisting of:

$$v_P(\sigma_V, \sigma_h) = v_P^{(0)} + \alpha_P^V \Delta\sigma_V + \alpha_P^h \Delta\sigma_h \text{ and}$$

$$v_S(\sigma_V, \sigma_h) = v_S^{(0)} + \alpha_S^V \Delta\sigma_V + \alpha_S^h \Delta\sigma_h,$$

wherein $v_P^{(0)} = v_P(\sigma_V^{(0)}, \sigma_h^{(0)})$, $v_S^{(0)} = v_S(\sigma_V^{(0)}, \sigma_h^{(0)})$, $\sigma_V = \sigma_V^{(0)} + \Delta\sigma_V$, $\sigma_h = \sigma_h^{(0)} + \Delta\sigma_h$, and wherein to calculate the stress sensitivity coefficient:

$\sigma_V^{(0)}$ is an effective vertical stress value associated with the common reference location, $\sigma_h^{(0)}$ is an first effective minimum horizontal stress value associated with the common reference location, $\sigma_V$ is an effective vertical stress value associated with one selected from a group consisting of the first location and the second location, $\sigma_h$ is an effective minimum horizontal stress value associated one selected from a group consisting of the first location and the second location, $\Delta\sigma_V$ is a difference between one selected from a group consisting of the first location and the second location and the effective vertical stress value at the common reference location, $\Delta\sigma_h$ is a difference between one selected from a group consisting of the first location and the second location and the effective minimum horizontal stress value at the common reference location, $v_P^{(0)}$ is a reference P-wave velocity associated with the common reference location, $v_S^{(0)}$ is a reference S-wave velocity associated with the common reference location, $\alpha_P^V$ is a vertical compressional stress sensitivity coefficient, $\alpha_P^h$ is a minimum horizontal compressional stress sensitivity coefficient, $\alpha_S^V$ is a vertical shear stress sensitivity coefficient, $\alpha_S^h$ is a minimum horizontal shear stress sensitivity coefficient, $v_P(\sigma_V, \sigma_h)$ is a reference P-wave velocity associated with the one selected from a group consisting of the first location and the second location, and $v_S(\sigma_V, \sigma_h)$ is a reference S-wave velocity associated with the one selected from a group consisting of the first location and the second location, and wherein the stress sensitivity coefficient is one selected from a group consisting of $\alpha_P^V$, $\alpha_P^h$, $\alpha_S^V$, and $\alpha_S^h$.

25. The computer readable medium of claim 21, wherein the stress-velocity relationship equation comprises at least one selected from a group consisting of:

$$v_P(\sigma_V, \sigma_h, \sigma_H) = v_P^{(0)} + \alpha_P^V \Delta v_V + \alpha_P^h \Delta\sigma_h + \alpha_P^H \Delta\sigma_H \text{ and}$$

$$v_{S1}(\sigma_V, \sigma_h, \sigma_H) = v_{S1}^{(0)} + \alpha_{S1}^V \Delta\sigma_V + \alpha_{S1}^h \Delta\sigma_h + \alpha_{S1}^H \Delta\sigma_H$$

$$v_{S2}(\sigma_V, \sigma_h, \sigma_H) = v_{S2}^{(0)} + \alpha_{S2}^V \Delta\sigma_V + \alpha_{S2}^h \Delta\sigma_h + \alpha_{S2}^H \Delta\sigma_H$$

wherein $v_P^{(0)} = v_P(\sigma_V^{(0)}, \sigma_h^{(0)})$, $v_{S1}^{(0)} = v_{S1}(\sigma_V^{(0)}, \sigma_h^{(0)})$, $v_{S2}^{(0)} = v_{S2}(\sigma_V^{(0)}, \sigma_h^{(0)})$, $\sigma_V = \sigma_V^{(0)} + \Delta\sigma_V$, $\sigma_h = \sigma_h^{(0)} + \Delta\sigma_h$, $\sigma_H = \sigma_H^{(0)} + \Delta\sigma_H$ and wherein to calculate the stress sensitivity coefficient:

$\sigma_V^{(0)}$ is an effective vertical stress value associated with the common reference location, $\sigma_h^{(0)}$ is an first effective minimum horizontal stress value associated with the common reference location, $\sigma_H^{(0)}$ is an first effective maximum horizontal stress value associated with the common reference location, $\sigma_V$ is an effective vertical stress value associated with one selected from a group consisting of the first location and the second location, $\sigma_h$ is an effective minimum horizontal stress value associated one selected from a group consisting of the first location and the second location, $\sigma_H$ is an effective maximum horizontal stress value associated one selected from a group consisting of the first location and the second location, $\Delta\sigma_V$ is a difference between one selected from a group consisting of the first location and the second location and the effective vertical stress value at the common reference location, $\Delta\sigma_h$ is a difference between one selected from a group consisting of the first location and the second location and the effective minimum horizontal stress value at the common reference location, $\Delta\sigma_H$ is a difference between one selected from a group consisting of the first location and the second location and the effective maximum horizontal stress value at the common reference location, $v_P^{(0)}$ is a reference P-wave velocity associated with the common reference location, $v_{S1}^{(0)}$ is a first reference S-wave velocity associated with the common reference location, $v_{S2}^{(0)}$ is a second reference S-wave velocity associated with the common reference location, $\alpha_P^V$ is a vertical compressional stress sensitivity coefficient, $\alpha_P^h$ is a minimum horizontal compressional stress sensitivity coefficient, $\alpha_P^H$ is a maximum horizontal compressional stress sensitivity coefficient, $\alpha_{S1}^V$ is a first vertical shear stress sensitivity coefficient, $\alpha_{S2}^V$ is a second vertical shear stress sensitivity coefficient, $\alpha_{S1}^h$ is a first minimum horizontal shear stress sensitivity coefficient, $\alpha_{S2}^h$ is a second minimum horizontal shear stress sensitivity coefficient, $\alpha_{S1}^H$ is a first maximum horizontal shear stress sensitivity coefficient, $\alpha_{S2}^H$ is a second maximum horizontal shear stress sensitivity coefficient, $v_P(\sigma_V, \sigma_h, \sigma_H)$ is a reference P-wave velocity associated with the one selected from a group consisting of the first location and the second location, $v_{S1}(\sigma_V, \sigma_h, \sigma_H)$ is a first reference S-wave velocity associated with the one selected from a group consisting of the first location and the second location, and $v_{S2}(\sigma_V, \sigma_h, \sigma_H)$ is a second reference S-wave velocity associated with the one selected from a group consisting of the first location and the second location, wherein the shear wave comprises the first reference S-wave velocity and the second reference S-wave velocity, and wherein the stress sensitivity coefficient is one selected from a group consisting of $\alpha_P^V$, $\alpha_P^h$, $\alpha_P^H$, $\alpha_{S1}^V$, $\alpha_{S1}^h$, $\alpha_{S1}^H$, $\alpha_{S2}^V$, $\alpha_{S2}^h$, and $\alpha_{S2}^H$.

26. The computer readable medium of claim 21, wherein at least one selected from a group consisting of the common reference location, the first location in the offset well, and the second location in the offset well comprises physical properties that are substantially similar to the pre-drill location.

27. The method of claim 2, wherein calculating the total stress value comprises using a numerical model, wherein the numerical model calculates the total stress value in a volume that includes the pre-drill location and at least one selected from a group consisting of the common reference location, the first location in the offset well, and the second location in the offset well.

28. The computer readable medium of claim 20, wherein the pre-drill location is located below a low permeability substance.

29. The computer readable medium of claim 28, wherein the low permeability substance is salt.

30. The computer readable medium of claim 20, wherein calculating the stress sensitivity coefficient comprises using a micromechanical model.

31. The computer readable medium of claim 20, wherein obtaining the P-wave velocity and the S-wave velocity comprises performing a look-ahead walkaway vertical seismic profile (VSP).

32. The computer readable medium of claim 20, wherein the stress sensitivity coefficient is validated by obtaining an alternate pore pressure at the pre-drill location using a pore pressure at a location in an offset well, information about a hydrostatic gradient between the location in the offset well and the pre-drill location, wherein the location in the offset well is located in a high permeability substance and the high permeability substance extends to the pre-drill location.

33. The computer readable medium of claim 20, wherein the stress sensitivity coefficient is validated by obtaining an alternate pore pressure at the pre-drill location, wherein the alternate pore pressure is determined using a pore pressure in an offset well and a centroid method, and wherein the location in the offset well is located in a low permeability substance, the pre-drill location is located in a high permeability substance, and the low permeability substance interfaces with the high permeability substance.

34. The computer readable medium of claim 20, wherein the stress-pressure relationship equation is $$\sigma_{ij} S_{ij} - \alpha p \delta_{ij},$$

where i and j refer to components of a tensor, $\alpha_{ij}$ is an effective stress component, $S_{ij}$ is the total stress component, $\alpha$ is a poroelastic coefficient, $\delta_{ij}$ is 1 if i=j, and $\delta_{ij}$ is 0 if i≠j.

35. The computer readable medium of claim 20, wherein the second pore pressure is calculated using at least one equation selected from the group consisting of:

$$v_P(S_V, S_h, p) = v_P^{(0)} + \alpha_P^V(\Delta S_V - \alpha \Delta p) + \alpha_P^h(\Delta S_h - \alpha \Delta p)$$

$$v_S(S_V, S_h, p) = v_S^{(0)} + \alpha_S^V(\Delta S_V - \alpha \Delta p) + \alpha_S^h(\Delta S_h - \alpha \Delta p)$$

wherein $v_P(S_V, S_h, p)$ is the P-wave velocity associated with the pre-drill location, and $v_S(S_V, S_h, p)$ is the S-wave velocity associated with the pre-drill location, $v_P^{(0)}$ is a reference P-wave velocity associated with the reference location, $v_S^{(0)}$ is a reference S-wave velocity associated with the reference location, $S_{84}$ is a total vertical stress obtained from the total stress value, $S_h$ is a total minimum horizontal stress obtained from the total stress value, p corresponds to one selected from the group consisting of the first predicted pore pressure, the second pore pressure, and a pore pressure at the reference location, and $\alpha$ is a poroelastic coefficient, and wherein terms preceded by $\Delta$ represent the difference between values at the pre-drill location and the reference location.

36. The computer readable medium of claim 20, wherein adjusting the drilling operation comprises at least one selected from a group consisting of adjusting a drilling fluid density, adjusting a drilling trajectory, and optimizing a number of casing strings in a borehole.

37. The computer readable medium of claim 20, wherein the pre-drill location comprises a location below an operating drill bit in a borehole.

38. The computer readable medium of claim 20, wherein in the first predicted pore pressure and the second pore pressure are displayed on a graphical user interface.

39. A downhole tool configured to perform a method for pore pressure prediction, the method comprising:
   obtaining a stress sensitivity coefficient;
   obtaining a compressional wave (P-wave) velocity and a shear wave (S-wave) velocity for a pre-drill location;
   obtaining a first predicted pore pressure;
   iteratively performing:
      calculating a total stress value associated with the pre-drill location using the first predicted pore pressure associated with the pre-drill location, and
      calculating a second predicted pore pressure associated with the pre-drill location using a stress-pressure relationship equation, a stress-velocity relationship equation, the stress sensitivity coefficient, a reference location, and at least one selected from a group consisting of the P-wave velocity and the S-wave velocity for the pre-drill location;
      wherein iterating is complete if a difference between the first predicted pore pressure and the second predicted pore pressure is less than or equal to a threshold difference value, and
      wherein the first predicted pore pressure is updated using the second predicted pore pressure if the difference is greater than the threshold difference value; and
   adjusting a drilling operation associated with the pre-drill location, based on the second predicted pore pressure.

40. The downhole tool of claim 39, wherein obtaining the stress sensitivity coefficient is performed using the stress-velocity relationship equation, a first location in an offset well, a second location in the offset well, and a common reference location.

41. The downhole tool of claim 40, wherein the reference location is located in the offset well.

42. The downhole tool of claim 40, wherein the first location comprises a first depth in an offset well and the second reference location comprises a second depth in the offset well.

43. The downhole tool of claim 40, wherein the stress-velocity relationship equation comprises at least one selected from a group consisting of:

$$v_P(\sigma_V, \sigma_h) = v_P^{(0)} + \alpha_P^V \Delta \sigma_V + \alpha_P^h \Delta \sigma_h \text{ and}$$

$$v_S(\sigma_V, \sigma_h) = v_S^{(0)} + \alpha_S^V \Delta \sigma_V + \alpha_S^h \Delta \sigma_h,$$

wherein
$v_P^{(0)} = v_P(\sigma_V^{(0)}, \sigma_h^{(0)})$, $v_S^{(0)} = v_S(\sigma_V^{(0)}, \sigma_h^{(0)})$, $\sigma_V = \sigma_V^{(0)} + \Delta \sigma_V$, $\sigma_h = \sigma_h^{(0)} + \Delta \sigma_h$, and wherein to calculate the stress sensitivity coefficient:

$\sigma_V^{(0)}$ is an effective vertical stress value associated with the common reference location, $\sigma_h^{(0)}$ is an first effective minimum horizontal stress value associated with the common reference location, $\sigma_V$ is an effective vertical stress value associated with one selected from a group consisting of the first location and the second location, $\sigma_h$ is an effective minimum horizontal stress value associated one selected from a group consisting of the first location and the second location, $\Delta\sigma_V$ is a difference between one selected from a group consisting of the first location and the second location and the effective vertical stress value at the common reference location, $\Delta\sigma_h$ is a difference between one selected from a group consisting of the first location and the second location and the effective minimum horizontal stress value at the common reference location, $v_P^{(0)}$ is a reference P-wave velocity associated with the common reference location, $v_S^{(0)}$ is a reference S-wave velocity associated with the common reference location, $\alpha_P^V$ is a vertical compressional stress sensitivity coefficient, $\alpha^{ph}$ is a minimum horizontal compressional stress sensitivity coefficient, $\alpha_S^V$ is a vertical shear stress sensitivity coefficient, $\alpha_S^H$ is a minimum horizontal shear stress sensitivity coefficient, $v_P(\sigma_V, \sigma_h)$ is a reference P-wave velocity associated with the one selected from a group consisting of the first location and the second location, and $v_S(\sigma_V, \sigma_h)$ is a reference S-wave velocity associated with the one selected from a group consisting of the first location and the second location, and wherein the stress sensitivity coefficient is one selected from a group consisting of $\alpha_P^V$, $\alpha_P^h$, $\alpha_S^V$, and $\alpha_S^h$.

44. The downhole tool of claim 40, wherein the stress-velocity relationship equation comprises at least one selected from a group consisting of:

$$v_P(\sigma_V, \sigma_h, \sigma_H) = v_P^{(0)} + \alpha_P^V \Delta\sigma_V + \alpha_P^h \Delta\sigma_h + \alpha_P^H \Delta\sigma_H,$$

$$v_{S1}(\sigma_V, \sigma_h, \sigma_H) = v_{S1}^{(0)} + \alpha_{S1}^V \Delta\sigma_V + \alpha_{S1}^h \Delta\sigma_h + \alpha_{S1}^H \Delta\sigma_H,$$
and $$v_{S2}(\sigma_V, \sigma_h, \sigma_H) = v_{S2}^{(0)} + \alpha_{S2}^V \Delta\sigma_V + \alpha_{S2}^h \Delta\sigma_h + \alpha_{S2}^H \Delta\sigma_H,$$

wherein $v_P^{(0)} = v_P(\sigma_V^{(0)}, \sigma_h^{(0)})$, $v_{S1}^{(0)} = v_{S1}(\sigma_V^{(0)}, \sigma_h^{(0)})$, $v_{S2}^{(0)} = v_{S2}(\sigma_V^{(0)}, \sigma_h^{(0)})$, $\sigma_V = \sigma_V^{(0)} + \Delta\sigma_V$, $\sigma_h = \sigma_h^{(0)} + \Delta\sigma_h$, $\sigma_H = \sigma_H^{(0)} + \Delta\sigma_H$ and wherein to calculate the stress sensitivity coefficient:

$\sigma_V^{(0)}$ is an effective vertical stress value associated with the common reference location, $\sigma_h^{(0)}$ is an first effective minimum horizontal stress value associated with the common reference location, $\sigma_H^{(0)}$ is an first effective maximum horizontal stress value associated with the common reference location, $\sigma_V$ is an effective vertical stress value associated with one selected from a group consisting of the first location and the second location, $\sigma_h$ is an effective minimum horizontal stress value associated one selected from a group consisting of the first location and the second location, $\sigma_H$ is an effective maximum horizontal stress value associated one selected from a group consisting of the first location and the second location, $\Delta\sigma_V$ is a difference between one selected from a group consisting of the first location and the second location and the effective vertical stress value at the common reference location, $\Delta\sigma_h$ is a difference between one selected from a group consisting of the first location and the second location and the effective minimum horizontal stress value at the common reference location, $\Delta\sigma_H$ is a difference between one selected from a group consisting of the first location and the second location and the effective maximum horizontal stress value at the common reference location, $v_P^{(0)}$ is a reference P-wave velocity associated with the common reference location, $v_{S1}^{(0)}$ is a first reference S-wave velocity associated with the common reference location, $v_{S2}^{(0)}$ is a second reference S-wave velocity associated with the common reference location, $\alpha_P^V$ is a vertical compressional stress sensitivity coefficient, $\alpha_P^h$ is a minimum horizontal compressional stress sensitivity coefficient, $\alpha^{pH}$ is a maximum horizontal compressional stress sensitivity coefficient, $\alpha_{S1}^V$ is a first vertical shear stress sensitivity coefficient, $\alpha_{S2}^V$ is a second vertical shear stress sensitivity coefficient, $\alpha_{S1}^h$ is a first minimum horizontal shear stress sensitivity coefficient, $\alpha_{S2}^h$ is a second minimum horizontal shear stress sensitivity coefficient, $\alpha_{S1}^H$ is a first maximum horizontal shear stress sensitivity coefficient, $\alpha_{S2}^H$ is a second maximum horizontal shear stress sensitivity coefficient, $v_P(\sigma_V, \sigma_h, \sigma_H)$ is a reference P-wave velocity associated with the one selected from a group consisting of the first location and the second location, $v_{S1}(\sigma_V, \sigma_h, \sigma_H)$ is a first reference S-wave velocity associated with the one selected from a group consisting of the first location and the second location, and $v_{S2}(\sigma_V, \sigma_h, \sigma_H)$ is a second reference S-wave velocity associated with the one selected from a group consisting of the first location and the second location, wherein the shear wave comprises the first reference S-wave velocity and the second reference S-wave velocity, and wherein the stress sensitivity coefficient is one selected from a group consisting of $\alpha_P^V$, $\alpha_P^h$, $\alpha_P^H$, $\alpha_{S1}^V$, $\alpha_{S1}^h$, $\alpha_{S1}^H$, $\alpha_{S2}^V$, $\alpha_{S2}^h$, and $\alpha_{S2}^H$.

45. The downhole tool of claim 40, wherein at least one selected from a group consisting of the common reference location, the first location in the offset well, and the second location in the offset well comprises physical properties that are substantially similar to the pre-drill location.

46. The downhole tool of claim 40, wherein calculating the total stress value comprises using a numerical model, wherein the numerical model calculates the total stress value in a volume that includes the pre-drill location and at least one selected from a group consisting of the common reference location, the first location in the offset well, and the second location in the offset well.

47. The downhole tool of claim 39, wherein the pre-drill location is located below a low permeability substance.

48. The downhole tool of claim 47, wherein the low permeability substance is salt.

49. The downhole tool of claim 39, wherein calculating the stress sensitivity coefficient comprises using a micromechanical model.

50. The downhole tool of claim 39, wherein obtaining the P-wave velocity and the S-wave velocity comprises performing a look-ahead walkaway vertical seismic profile (VSP).

51. The downhole tool of claim 39, wherein the stress sensitivity coefficient is validated by obtaining an alternate pore pressure at the pre-drill location using a pore pressure at a location in an offset well, information about a hydrostatic gradient between the location in the offset well and the pre-drill location, wherein the location in the offset well is located in a high permeability substance and the high permeability substance extends to the pre-drill location.

52. The downhole tool of claim 39, wherein the stress sensitivity coefficient is validated by obtaining an alternate pore pressure at the pre-drill location, wherein the alternate pore pressure is determined using a pore pressure in an offset well and a centroid method, and wherein the location in the offset well is located in a low permeability substance, the pre-drill location is located in a high permeability substance, and the low permeability substance interfaces with the high permeability substance.

53. The downhole tool of claim 39, wherein the stress-pressure relationship equation is $$\sigma_{ij} = S_{ij} - \alpha p \delta_{ij},$$

wherein i and j refer to components of a tensor, $\sigma_{ij}$ is an effective stress component, $S_{ij}$ is a total stress component, $\alpha$ is a poroelastic coefficient, $\delta_{ij}$ is 1 if i=j, and $\delta_{ij}$ is 0 if i≠j.

54. The downhole tool of claim 39, wherein the second pore pressure is calculated using at least one equation selected from the group consisting of:

$$v_P(S_V, S_h, p) = v_P^{(0)} + \alpha_P^V(\Delta S_V - \alpha \Delta p) + \alpha_P^h(\Delta S_h - \alpha \Delta p)$$

$$v_S(S_V, S_h, p) = v_S^{(0)} + \alpha_S^V(\Delta S_V - \alpha \Delta p) + \alpha_S^h(\Delta S_h - \alpha \Delta p)$$

wherein $v_P(S_V, S_h, p)$ is the P-wave velocity associated with the pre-drill location, and $v_S(S_V, S_h, p)$ is the S-wave velocity associated with the pre-drill location, $v_P^{(0)}$ is a reference P-wave velocity associated with the reference location, $v_S^{(0)}$ is a reference S-wave velocity associated with the reference location, $S_v$ is a total vertical stress obtained from the total stress value, $S_h$ is a total minimum horizontal stress obtained from the total stress value, p corresponds to one selected from the group consisting of the first predicted pore pressure, the second pore pressure, and a pore pressure at the reference location, and $\alpha$ is a poroelastic coefficient, and wherein terms preceded by $\Delta$ represent the difference between values at the pre-drill location and the reference location.

55. The downhole tool of claim 39, wherein adjusting the drilling operation comprises at least one selected from a group consisting of adjusting a drilling fluid density, adjusting a drilling trajectory, and optimizing a number of casing strings in a borehole.

56. The downhole tool of claim 39, wherein the pre-drill location comprises a location below an operating drill bit in a borehole.

57. The downhole tool of claim 39, wherein in the first predicted pore pressure and the second pore pressure are displayed on a graphical user interface.

* * * * *

UNITED STATES PATENT AND TRADEMARK OFFICE
CERTIFICATE OF CORRECTION

PATENT NO. : 7,299,132 B2  
APPLICATION NO. : 11/499931  
DATED : November 20, 2007  
INVENTOR(S) : Colin Michael Sayers et al.

Page 1 of 2

It is certified that error appears in the above-identified patent and that said Letters Patent is hereby corrected as shown below:

Column 6, line 42, "$\sigma^{v(0)}$" should be -- $\sigma_V^{(0)}$ --.

Column 6, line 54, "$v^{s(0)}$" should be -- $v_S^{(0)}$ --.

Column 9, line 59, the word "Runcom" should be -- Runcorn --.

Column 10, line 16, "$\alpha_{ij}$" should be -- $\sigma_{ij}$ --.

In the Claims:

In claim 5, column 13, line 58-59, " $v_P^{(0)}v_P(\sigma_V^{(0)},\sigma_h^{(0)})$, $v_S^{(0)=v}{}_S(\sigma_V^{(0)},\sigma_h^{(0)})$, $\sigma_V = \sigma_V^{(0)} + \Delta\sigma_V, \sigma_h = \sigma_h^{(0)} + \Delta\sigma_h,$ " should be -- $v_P^{(0)} = v_P(\sigma_V^{(0)},\sigma_h^{(0)})$, $v_S^{(0)} = v_S(\sigma_V^{(0)},\sigma_h^{(0)})$, $\sigma_V = \sigma_V^{(0)} + \Delta\sigma_V, \sigma_h = \sigma_h^{(0)} + \Delta\sigma_h,$ --.

In claim 5, column 14, line 14, "$\alpha^{ph}$" should be -- $\alpha_P^h$ --.

In claim 6, column 14, line 36-37, " $v_P^{(0)} = v_P(\sigma_V^{(0)},\sigma_h^{(0)})$, $v_{S1}^{(0)} = v_{S1}(\sigma_V^{(0)},\sigma_h^{(0)})$, $v_{S2}^{(0)} = v_{S2}(\sigma_V^{(0)},\sigma_h^{(0)})$, $\sigma_V = \sigma_V^{(0)} + \Delta\sigma_V$, $\sigma_h = \sigma_h^{(0)} + \Delta\sigma_h$, $\sigma_H^{(0)} + \Delta\sigma_H$ " should be -- $v_P^{(0)} = v_P(\sigma_V^{(0)},\sigma_h^{(0)})$, $v_{S1}^{(0)} = v_{S1}(\sigma_V^{(0)},\sigma_h^{(0)})$, $v_{S2}^{(0)} = v_{S2}(\sigma_V^{(0)},\sigma_h^{(0)})$, $\sigma_V = \sigma_V^{(0)} + \Delta\sigma_V$, $\sigma_h = \sigma_h^{(0)} + \Delta\sigma_h$, $\sigma_H = \sigma_H^{(0)} + \Delta\sigma_H$ --.

In claim 6, column 15, line 5, "$\alpha^{pH}$" should be -- $\alpha_P^H$ --.

In claim 24, column 17, line 46, "$\alpha^{ph}$" should be -- $\alpha_P^h$ --.

In claim 25, column 17, line 62, " $v_P(\sigma_V,\sigma_h,\sigma_H) = v_P^{(0)} + \alpha_P^V\Delta_{VV} + \alpha_P^h\Delta\sigma_h + \alpha_P^H\Delta\sigma_H$ " should be -- $v_P(\sigma_V,\sigma_h,\sigma_H) = v_P^{(0)} + \alpha_P^V\Delta\sigma_V + \alpha_P^h\Delta\sigma_h + \alpha_P^H\Delta\sigma_H$ --.

In claim 25, column 18, line 37, "$\alpha^{pH}$" should be -- $\alpha_P^H$ --.

In claim 25, column 18, line 54, after the word "location," the word --and-- is erroneously missing.

UNITED STATES PATENT AND TRADEMARK OFFICE
CERTIFICATE OF CORRECTION

PATENT NO.         : 7,299,132 B2
APPLICATION NO.    : 11/499931
DATED              : November 20, 2007
INVENTOR(S)        : Colin Michael Sayers et al.

It is certified that error appears in the above-identified patent and that said Letters Patent is hereby corrected as shown below:

In claim 25, column 18, line 57, the word "and" should be deleted.

In claim 34, column 19, line 40, "$\sigma_{ij}S_{ij} - \alpha p\delta_{ij}$" should be -- $\sigma_{ij}=S_{ij} - \alpha p\delta_{ij}$ --.

In claim 34, column 19, line 41, "$\alpha_{ij}$" should be -- $\alpha^{ij}$ --.

In claim 35, column 19, line 59, "$S_{84}$" should be -- $S_v$ --.

In claim 43, column 21, line 14, "$\alpha^{ph}$" should be -- $\alpha_P^h$ --.

In claim 43, column 21, line 16, " $\alpha_S^H$ " should be -- $\alpha_S^h$ --.

In claim 44, column 22, line 5, "$\alpha^{ph}$" should be -- $\alpha_P^h$ --.

Signed and Sealed this

Thirteenth Day of May, 2008

JON W. DUDAS
*Director of the United States Patent and Trademark Office*